US011533709B2

(12) United States Patent
McClelland et al.

(10) Patent No.: US 11,533,709 B2
(45) Date of Patent: Dec. 20, 2022

(54) DEVICE, SYSTEM AND METHOD FOR TRANSMITTING NOTIFICATIONS BASED ON INDICATIONS OF EFFECTIVENESS FOR PREVIOUS NOTIFICATIONS

(71) Applicant: MOTOROLA SOLUTIONS, INC., Chicago, IL (US)

(72) Inventors: Adam McClelland, London (GB); Isabel Firpo, Chicago, IL (US); Ron Wilson, Chicago, IL (US); Meurig Sage, London (GB)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/205,488

(22) Filed: Mar. 18, 2021

(65) Prior Publication Data

US 2022/0303947 A1 Sep. 22, 2022

(51) Int. Cl.
*H04W 68/02* (2009.01)
*H04W 4/90* (2018.01)

(52) U.S. Cl.
CPC ............. *H04W 68/02* (2013.01); *H04W 4/90* (2018.02)

(58) Field of Classification Search
CPC ................................ H04W 68/02; H04W 4/90
See application file for complete search history.

(56) References Cited

U.S. PATENT DOCUMENTS

| | | |
|---|---|---|
| 7,301,450 B2 | 11/2007 | Carrino |
| RE44,535 E | 10/2013 | Zimmers et al. |
| 9,449,491 B2 | 9/2016 | Sager et al. |
| 9,495,693 B2 | 11/2016 | Box et al. |
| 2009/0325535 A1* | 12/2009 | Felt .......................... H04W 4/90 455/404.1 |
| 2012/0202446 A1* | 8/2012 | Nichols ................... H04W 4/02 455/466 |
| 2016/0307286 A1* | 10/2016 | Miasnik ................ H04W 4/029 |
| 2017/0303109 A1 | 10/2017 | Sennett et al. |
| 2020/0398743 A1* | 12/2020 | Huber .................... G06V 40/10 |
| 2020/0404476 A1* | 12/2020 | Sweet .................... G08B 25/12 |

(Continued)

FOREIGN PATENT DOCUMENTS

| | | |
|---|---|---|
| WO | 2014170752 A2 | 10/2014 |
| WO | WO-2016191497 A1 | 12/2016 |

*Primary Examiner* — Minjung Kim
(74) *Attorney, Agent, or Firm* — Perry + Currier, Inc.

(57) ABSTRACT

A device, system and method for transmitting notifications based on indications of effectiveness for previous notifications is provided. A public-safety answering point (PSAP) device transmits, to first communication devices, a first notification of a given type, associated with a first public-safety incident. The PSAP device, subsequent to transmitting the first notification, tracks indications of effectiveness of the first notification determined from one or more of: PSAP call traffic; locations and/or responses of the first communication devices and/or PSAP-related data retrieved from one or more servers external or internal to a PSAP system. The PSAP device transmits, to second communication devices, a second notification of the given type, the second notification associated with a second public-safety incident; one or more of the second notification and transmitting of the second notification being modified, relative to the first notification, based on the one or more indications of effectiveness.

19 Claims, 6 Drawing Sheets

(56) References Cited

U.S. PATENT DOCUMENTS

2021/0120394 A1\* 4/2021 Martin .................... H04L 67/52
2021/0255309 A1\* 8/2021 Wilson ...................... G01S 5/10
2021/0366267 A1\* 11/2021 Connell, II ............ G08B 25/04

\* cited by examiner

DEVICE, SYSTEM AND METHOD FOR TRANSMITTING NOTIFICATIONS BASED ON INDICATIONS OF EFFECTIVENESS FOR PREVIOUS NOTIFICATIONS

BACKGROUND OF THE INVENTION

At public safety answering point (PSAP) devices and/or systems, when incidents occur, mass notifications may be transmitted to communication devices to notify them of public-safety incidents, and the like. However, such notifications may result in many calls to the PSAP devices and/or systems, many of which may be irrelevant, and which may waste processing and/or bandwidth resources.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
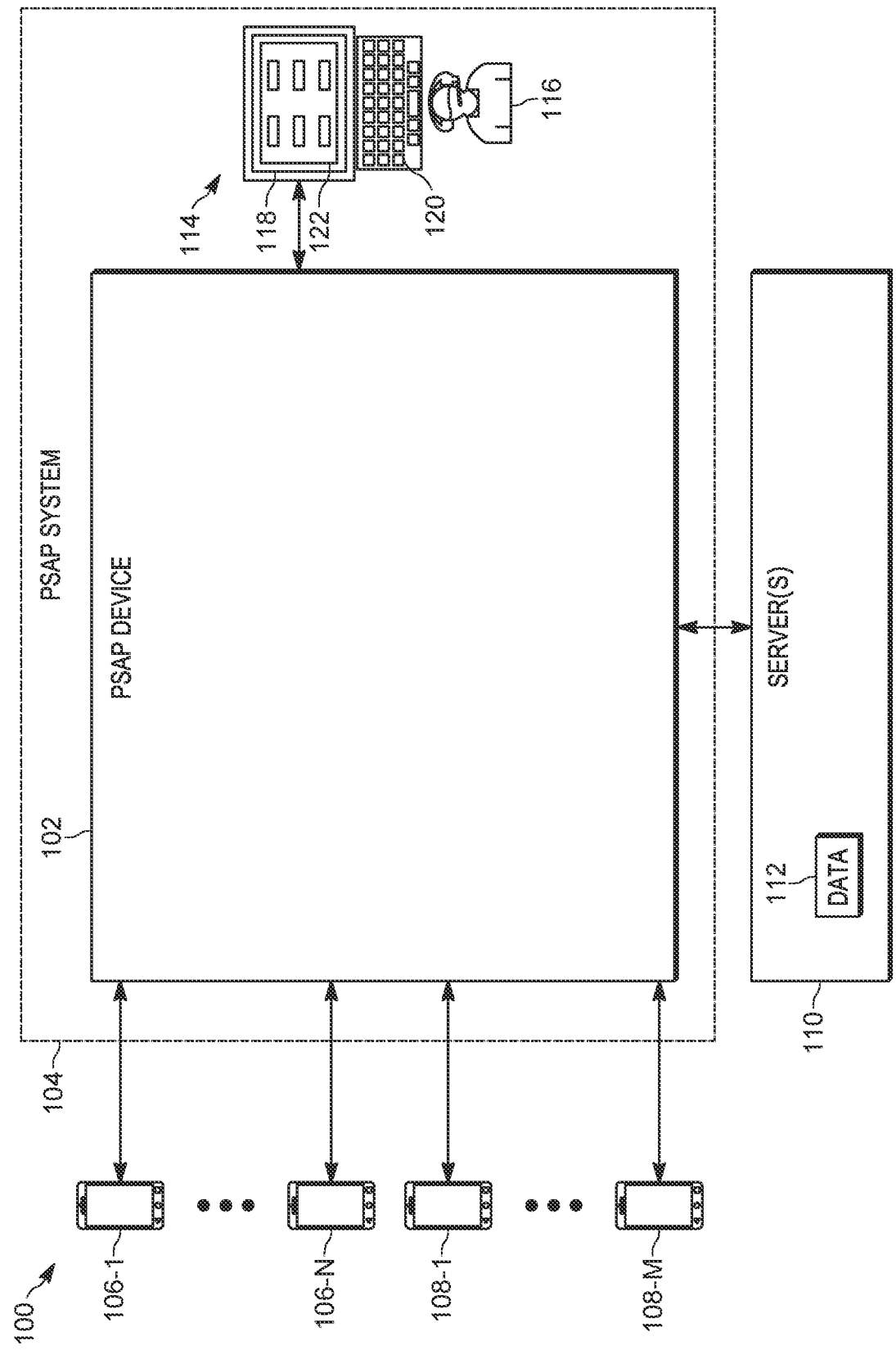
FIG. 1 is a system for transmitting notifications based on indications of effectiveness for previous notifications, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

At public safety answering point (PSAP) devices and/or systems, when incidents occur, mass notifications may be transmitted to communication devices to notify them of public-safety incidents, and the like. However, such notifications may result in many calls to the PSAP devices and/or systems, many of which may be irrelevant, and which may waste processing and/or bandwidth resources. Conversely, such notifications may not result in calls to the PSAP devices and/or systems, for example, when the notifications are for soliciting public-safety tips about an incident, which may result in the public-safety incident going unresolved. Similarly, such notifications may result in a crowd converging on a location of the public-safety incident, which may cause the public-safety incident to escalate. Thus, there exists a need for an improved technical method, device, and system for transmitting notifications based on indications of effectiveness for previous notifications.

Hence, provided herein is a device, system and method for transmitting notifications based on indications of effectiveness for previous notifications. For example, a first public-safety incident may occur and a PSAP device may transmit a first notification associated with the first public-safety incident, the first notification being of a given type. The first communication devices may comprise communication devices that have registered to receive such notifications, for example via an application, text messages, emails, and the like.

In one example, the given type of the first notification may be of a public-safety tip solicitation type (e.g., such as an AMBER alert, a SILVER alert, an incident information request, a suspect information request, and/or be-on-the-lookout (BOLO) alert, and the like) to solicit public-safety tips regarding the first public-safety incident; in another example, the given type of the first notification may be of a crowd control type (e.g., an evacuation alert, a hazardous materials alert, and/or a geographic area avoidance alert, and the like) to cause crowds and/or vehicles to move away from the first public-safety incident, among other possibilities.

The PSAP device, subsequent to transmitting the first notification, tracks one or more indications of effectiveness of the first notification. Such indications of effectiveness generally indicate how effective the first notification was at assisting the PSAP device and/or first responders, and the like, with the first public-safety incident. In particular, such indications of effectiveness may be determined from one or more of: PSAP call traffic; one or more of locations and responses of the first communication devices; and PSAP-related data retrieved from one or more servers external or internal to a PSAP system that includes the PSAP device.

When a second public-safety incident occurs, the PSAP device may transmit a second notification of the given type to second communication devices (e.g., subsets of which may be the same or different from the first communication devices), the second notification and/or the transmission thereof, being modified, relative to the first notification, based on the one or more indications of effectiveness of the first notification.

For example, the second notification may include modified content to better solicit public-safety tips and/or better move a crowd and/or vehicles away from the second public-safety incident, and/or the second notification may be transmitted at a different time of day relative to the first notification, and/or the second notification may be transmitted to communication devices in a larger (or smaller) geographic region than the first notification, among other possibilities. Regardless, the second notification is generally modified, relative to the first notification, to attempt to be more effective at assisting the PSAP device and/or first responders, and the like, with the second public-safety incident than was the first notification at assisting the PSAP device and/or first responders, and the like, with the first public-safety incident. In particular, the second notification may lead to more effective use of processing and/or bandwidth resources at the PSAP device relative to the first notification.

An aspect of the specification provides a method comprising: transmitting, via a public-safety answering point (PSAP) device, to first communication devices, a first notification of a given type, the first notification associated with a first public-safety incident; subsequent to transmitting the first notification, tracking, via the PSAP device, one or more indications of effectiveness of the first notification determined from one or more of: PSAP call traffic; one or more of locations and responses of the first communication devices; and PSAP-related data retrieved from one or more servers external or internal to a PSAP system that includes the PSAP device; and transmitting, via the PSAP device, to second communication devices, a second notification of the given type, the second notification associated with a second public-safety incident; one or more of the second notification and the transmitting of the second notification being modified, relative to the first notification, based on the one or more indications of effectiveness of the first notification.

Another aspect of the specification provides a public-safety answering point (PSAP) device comprising: a communication unit; and a controller communicatively coupled to the communication unit, the controller configured to: transmit, via the communication unit, to first communication devices, a first notification of a given type, the first notification associated with a first public-safety incident; subsequent to transmitting the first notification, tracking one or more indications of effectiveness of the first notification determined from one or more of: PSAP call traffic; one or more of locations and responses of the first communication devices; and PSAP-related data retrieved from one or more servers external or internal to a PSAP system that includes the PSAP device; and transmit, via the communication unit, to second communication devices, a second notification of the given type, the second notification associated with a second public-safety incident; one or more of the second notification and transmitting of the second notification being modified, relative to the first notification, based on the one or more indications of effectiveness of the first notification.

Each of the above-mentioned aspects will be discussed in more detail below, starting with example system and device architectures of the system in which the embodiments may be practiced, followed by an illustration of processing blocks for achieving an improved technical method, device, and system for transmitting notifications based on indications of effectiveness for previous notifications.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Attention is directed to FIG. 1, which depicts an example system 100 for transmitting notifications based on indications of effectiveness for previous notifications. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks, and the like.

The system 100 comprises a PSAP device 102, which may generally be configured as a call-taking device, amongst other possibilities, for a PSAP system 104. For example, as depicted, the PSAP device 102 may be configured to communicate with first communication devices 106-1 . . . 106-N and second communication devices 108-1 . . . 108-M. The first communication devices 106-1 . . . 106-N are interchangeably referred to hereafter, collectively, as the first communication devices 106 and, generically, as a first communication device 106. This convention will be used throughout the present specification. For example, the second communication devices 108-1 . . . 108-M are interchangeably referred to hereafter, collectively, as the second communication devices 108 and, generically, as a second communication device 108.

The PSAP device 102 is generally configured to transmit notifications to the communication devices 106, 108 for example via a public-safety application installed at the communication devices 106, 108, text messages, email messages, and the like, for example to notify the communication devices 106, 108 of incidents that may occur in respective areas where the communication devices 106, 108 are located. As such, it is understood that the PSAP device 102 has access to one or more network addresses, phone numbers, application registration information, and the like, of the communication devices 106, 108 to effect such communication. For example, the communication devices 106, 108 may have registered such information at the PSAP device 102 and/or PSAP system 104. Put another way, it is understood that the first communication devices 106 and the second communication devices 108 are selected from communication devices registered to receive notifications. Such registration may also include registration of other information about the communication devices 106, 108 and/or operators (e.g., users) thereof, such as age, home address, and the like, of the operators. As such, numbers "N" and "M" of the communication devices 106, 108 may be any suitable numbers, and may be on the order tens, hundreds, thousands, or higher, of the communication devices 106, 108.

Furthermore, while the communication devices 106, 108 are depicted as different from one another, subsets of the communication devices 106, 108 may overlap with each other. For example, as will be described below, the PSAP device 102 transmits a first notification to the first communication devices 106, and, at a subsequent time, transmits a second notification to the second communication devices 108. Hence, while the communication devices 106, 108 are distinguished from another as the first communication devices 106 and the second communication devices 108, a second communication device 108 may also be a first communication device 106 that receives the first notification, and vice versa.

Furthermore, the communication devices 106, 108 may be transmitting respective locations to the PSAP device 102, for example as determined by respective location determining devices (e.g., such as respective Global Positioning System (GPS) devices, and the like) at the communication devices 106, 108, such that the PSAP device 102 has access to such locations relative to incidents that may occur.

The PSAP device 102 may further track and/or store other information associated with the communication devices 106, 108 including, but not limited to, content previously provided to the PSAP device 102 by the communication devices 106, 108, and the like, such as previous public-safety tips called (e.g., and/or messages) in to the PSAP device 102, among other possibilities.

As depicted, the system 100 further comprises one or more servers 110, which may be external (e.g., as depicted) or internal to the PSAP system 104. The one or more servers 110 store PSAP-related data 112, which may be accessed by the PSAP device 102 and used by the PSAP device 102 to determine indications of effectiveness of notifications to the communication devices 106, 108. Hence the PSAP device 102 is generally understood to be in communication with the one more servers 110.

The PSAP-related data 112 may be in any suitable format and may include historical data regarding previous public-safety incidents, and/or current data regarding a present public-safety incident. Hence, the PSAP-related data 112 may further comprise content previously provided to the PSAP device 102 by the communication devices 106, 108, and the like, such as content of previous responses and/or calls from the communication devices 106, 108 to the PSAP device 102, or other PSAPs, stored, for example, as text (e.g., any audio of the responses and/or calls may be converted to text via any suitable process such as those implemented by speech-to-text engines and/or converters, and the like).

Indeed, while only one PSAP device 102 and one PSAP system 104 are depicted, the system 100 may further comprise other PSAPs (e.g., other PSAP devices and/or PSAP systems), and the PSAP-related data 112 may include historical data of responses and/or calls to such PSAPs by the communication devices 106, 108 and/or other communication devices.

In particular, it is understood that the PSAP device 102, the PSAP system 104, and/or other PSAPs generally provide PSAP services to a given geographic area, such as a city, a county, a state, and the like, among other possibilities. Similarly the one or more servers 110 further service, and/or track and/or provide the PSAP-related data 112 for such a given geographic area.

The one or more servers 110, and associated PSAP-related data 112, may include, but is not limited to:

- A vehicle server, which tracks and/or stores vehicular traffic flow data (e.g., the PSAP-related data 112); such a vehicle server may be operated by a civic entity, such as a city, and/or a public-service entity, such as a police department, and the like, and vehicular traffic flow data therefrom may be used to determine an increase or decrease in vehicular traffic flow.
- A PSAP-related video server, which tracks and/or stores video data (e.g., the PSAP-related data 112) from cameras, such as closed-circuit cameras, and the like; such a vehicle server may be operated by a civic entity, such as a city, and/or a public-service entity, such as a police department, and the like, and video data therefrom may be used to determine an increase or decrease in citizen groupings and vehicular traffic flow, and/or movement of citizen groupings and vehicular traffic flow; in these examples, the PSAP device 102 and/or the PSAP-related video server is understood to include any suitable video analytics devices and/or engines, and the like, to analyze video data to determine an increase or decrease in citizen groupings and vehicular traffic flow, and/or movement of citizen groupings and vehicular traffic flow.
- An incident server, which tracks and/or stores incident data (e.g., the PSAP-related data 112); such an incident server may be operated by a public-service entity, such as a police department, a fire department, an emergency medical services department and the like, and real-time crime data therefrom may be used to determine an increase or decrease in incidents.
- A real-time crime center server, which tracks and/or stores real-time crime data (e.g., the PSAP-related data 112); such a real-time crime center server may be operated by a public-service entity, such as a police department, and the like, and real-time crime data therefrom may be used to determine an increase or decrease in crimes and/or incidents.
- A public works server, which tracks and/or stores public works data (e.g., the PSAP-related data 112, such as locations of crowds, vehicles, and the like); such a public works server may be operated by a civic entity, such as a city, and the like, and public works data therefrom may be used to determine an increase or decrease in citizen groupings and vehicular traffic flow, and/or movement of citizen groupings and vehicular traffic flow.
- A call handling server, which tracks and/or stores volume of call-related data (e.g., the PSAP-related data 112, such as numbers of calls to the PSAP device 102, and the like, for example by the communication devices 106, 108) and/or content of the call-related data (e.g., the PSAP-related data 112, such content provided by calls and/or responses of the communication devices 106, 108, as previously mentioned); such a call handling server may be internal to the PSAP system 104.

Such volume of call-related data may be used to determine whether volumes of calls are increasing or decreasing; similarly content of such calls may be used to determine increases or decreases in public-safety tips, complaints, etc., among other possibilities.

However, any suitable servers providing any suitable PSAP-related data 112 that enables the PSAP device 102 to track effectiveness of notifications is within the scope of the present specification, as described in more detail below.

In particular, the PSAP device 102 is generally configured to track one or more indications of effectiveness of a first notification transmitted to the first communication devices 106, the first notification being of a given type, and associated with a first public-safety incident. The one or more indications of effectiveness may be determined from one or more of: PSAP call traffic (e.g., calls to the PSAP device 102 and/or other PSAP devices, by the first communication devices 106 that receive the first notification); one or more of locations and responses of the first communication devices 106; and PSAP-related data retrieved from one or more of the servers 110.

The PSAP device 102 is further generally configured to transmit to the second communication devices 108, a second notification of the given type, associated with a second public-safety incident, with one or more of the second notification and the transmitting thereof being modified, relative to the first notification, based on the one or more indications of effectiveness of the first notification. The second public-safety incident may be in same and/or similar region as the first public-safety incident (e.g., regions of similar types, such as near railway tracks, and the like); however, the second public-safety incident may be a different region as the first public-safety incident (e.g., different parts of a larger geographic region serviced by the PSAP device 102 and/or PSAP system 104, and/or serviced by associated PSAPS). Various indications of effectiveness, but may include, but are not limited to:

- An increase or decrease to the PSAP call traffic that may result in response to the first notification, and such an increase or decrease to the PSAP call traffic may be specific to PSAPs associated with a first geographic area within which the first public-safety incident occurred.
- A number of the responses of the first communication devices 106 to the PSAP device 102 that may result from the first notification (e.g., such a calls, emails, text messages, and the like, to the PSAP device 102 from the first communication devices 106).
- One or more of a decrease, an increase, and movement of vehicular traffic flow within the first geographic area.
- One or more of a decrease, an increase, and movement of citizen groupings within the first geographic area.
- An increase or decrease in volume of public-safety tips associated with one or more of the first public-safety incident and the PSAP calls of the first communication devices 106.
- Changes of the locations of the first communication devices 106 relative to an incident location of the first public-safety incident (e.g., towards or away from the first public-safety incident).

However, any suitable indications of effectiveness are within the scope of the present specification.

In particular, such indications of effectiveness may show whether the first notification was effective or not effective, and/or indications of effectiveness may show a degree of effectiveness of the first notification.

For example, the first notification may be of a public-safety tip solicitation type (e.g., such as an AMBER alert, a SILVER alert, an incident information request, a suspect information request, and/or be-on-the-lookout (BOLO) alert, and the like), intended to solicit public-safety tips from the first communication devices 106. In these examples, in response to the first notification, a decrease in call traffic and/or public-safety tips to the PSAP device 102 (e.g., and/or associated PSAPs) may result, for example relative to previous volumes of call traffic and/or public-safety tips for similar notifications; as such, the first notification may be determined to be ineffective. Conversely, when the first notification is of a public-safety tip solicitation type, and an increase in call traffic and/or public-safety tips may result, relative to previous volumes of call traffic and/or public-safety tips, then the first notification may be determined to be effective.

However, in other examples, an increase in call traffic after the first notification may result in a determination that the first notification was ineffective, depending on a type of the first notification. For example, the first notification may be of a citizen-calming type intended to reassure citizens (e.g., operators of the first communication devices 106) that the first public-safety incident is minor and/or is not alarming; for example, the first notification may include text such as "Don't be alarmed by the current public-safety incident; the police have it under control". Hence, when call traffic increases in these examples, and/or when the content of such calls includes agitated and/or angry responses from operators of the first communication devices 106, the first notification may be determined to be ineffective; conversely, when call traffic decreases in these examples, the first notification may be determined to be effective.

Similarly, when the first notification is of a crowd control type (e.g., an evacuation alert, a hazardous materials alert, and/or a geographic area avoidance alert, and the like), intended to request that citizens and/or vehicles move away from the first geographic area within which the first public-safety incident occurred, and an increase in citizen groupings and/or vehicular traffic flow results in the first geographic area, for example relative to previous citizen groupings and/or vehicular traffic flow in the first geographic area prior to the first notification being transmitted, then the first notification may be determined to be ineffective. Conversely, when the first notification is of a crowd control type, and a decrease in citizen groupings and/or vehicular traffic flow results in the first geographic area, for example relative to previous citizen groupings and/or vehicular traffic flow in the first geographic area prior to the first notification being transmitted, then the first notification may be determined to be effective.

Other examples of indications of effectiveness are within the scope of the present specification. For example, a time of day of the first notification (and/or a time relative to a time of the first public-safety incident), and/or a size of the first geographic area within which the first communication devices 106 are located may also affect the effectiveness of the first notification. For example, an increase or decrease in call traffic, and/or an increase or decrease in citizens groupings and/or vehicular traffic flow may occur at one time relative to another time. Similarly, an increase or decrease in call traffic, and/or an increase or decrease in citizens groupings and/or vehicular traffic flow may occur at when a size of the first geographic area within which the first communication devices 106 are located, increases or decreases. It is understood that a size of the first geographic area may be selected prior to transmitting the first notification with the first communication devices 106 being located within the first geographic area (e.g., and other communication devices registered to receive notifications being excluded from receiving the first notification); hence, increasing or decreasing a size of a geographic area used to select which communication devices 106 to transmit a notification to, may result in an increase or decrease of effectiveness of a notification (e.g., relative to effectiveness of previous notifications).

Hence, put another way, the PSAP device 102 may generally determine one or more trends that increase the effectiveness of notifications of a given type, and subsequently transmit notifications of the given type, modified based on the trend, for example to transmit such subsequent notifications according to a modified time, modified content, a modified size of geographic area, and the like. Indeed, in some examples, the subsequent notifications may be modified to a type that is similar to, but not the same as, the given type of the previous notifications, intended to produce a given result, to attempt to produce the same given result. For example, when a crowd control type of a previous notification resulted in an increase of citizen groupings (e.g., and hence determined to be ineffective), subsequent notifications intended to control crowds may be changed to citizen-calming type of notifications.

As mentioned previously, given types of notifications (e.g., of the aforementioned first notification and the second notification) provided herein may include, but is not limited to, one or more of: an AMBER alert; a SILVER alert; an evacuation alert; an incident information request; a suspect information request; a hazardous materials alert; a geographic area avoidance alert; a be-on-the-lookout (BOLO) alert; among other possibilities.

As depicted, the system 100 and, in particular, the PSAP system 104 may further comprise a PSAP terminal 114, and the like, in communication with the PSAP device 102, operated, for example, by a call-taker 116 and/or a dispatcher, and the like. As depicted, the PSAP terminal 114 comprises a display screen 118 and an input device 120 (e.g., as such a keyboard, as depicted, a pointing device and/or any other suitable input device). However, the display screen 118 and the input device 120 may be provided in any suitable format (e.g., different from a PSAP terminal), such a laptop, a personal computer, and the like (e.g., when the call-taker 116 and/or a dispatcher is working from home and/or "off-premises" from the PSAP system 104). In general, the display screen 118 and the input device 120 may be used to interact with the PSAP device 102, for example to generate notifications to the communication devices 106, 108 via an interface 122 provided at the display screen 118, and the like. The interface 122 is described in more detail below with respect to FIG. 6.

Figure 2:
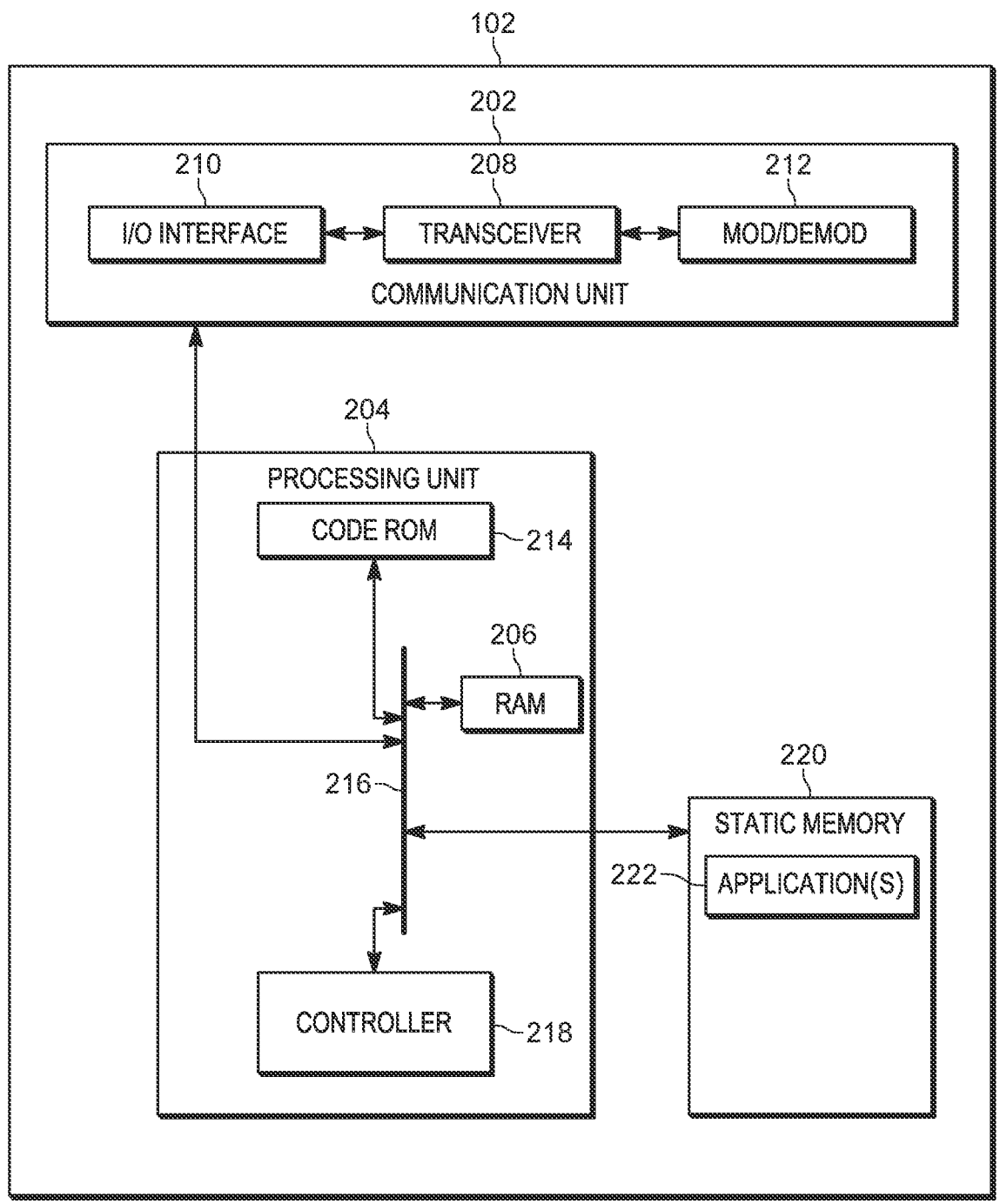
FIG. 2 is a device diagram showing a device structure of computing device for transmitting notifications based on indications of effectiveness for previous notifications, in accordance with some examples.

Attention is next directed to FIG. 2, which depicts a schematic block diagram of an example of the PSAP device 102. While the PSAP device 102 is depicted in FIG. 2 as a single component, functionality of the PSAP device 102 may be distributed among a plurality of components and the like including, but not limited to, the PSAP terminal 114 and/or one or more of the servers 110 and/or one or more PSAPs. In some examples, the PSAP device 102 may comprise one or more cloud-computing devices and/or one or more servers, and the like, and/or may be provided in any suitable format.

As depicted, the PSAP device 102 comprises: a communication unit 202, a processing unit 204, a Random-Access Memory (RAM) 206, one or more wireless transceivers 208 (e.g., which may be optional), one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. Hereafter, the at least one application 222 will be interchangeably referred to as the application 222. Furthermore, while the memories 206, 214 are depicted as having a particular structure and/or configuration, (e.g., separate RAM 206 and ROM 214), memory of the PSAP device 102 may have any suitable structure and/or configuration.

While not depicted, the PSAP device 102 may include one or more of an input device and a display screen (and/or any other suitable notification device) and the like, such as the input device 120 and/or the display screen 118, and the like.

As shown in FIG. 2, the PSAP device 102 includes the communication unit 202 communicatively coupled to the common data and address bus 216 of the processing unit 204.

The processing unit 204 may include the code Read Only Memory (ROM) 214 coupled to the common data and address bus 216 for storing data for initializing system components. The processing unit 204 may further include the controller 218 coupled, by the common data and address bus 216, to the Random-Access Memory 206 and the static memory 220.

The communication unit 202 may include one or more wired and/or wireless input/output (I/O) interfaces 210 that are configurable to communicate with other components of the system 100. For example, the communication unit 202 may include one or more wired and/or wireless transceivers 208 for communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP (3rd Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication unit 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the controller 218 and/or the PSAP device 102 is not a generic controller and/or a generic device, but a device specifically configured to implement functionality for transmitting notifications based on indications of effectiveness for previous notifications. For example, in some examples, the PSAP device 102 and/or the controller 218 specifically comprises a computer executable engine configured to implement functionality for transmitting notifications based on indications of effectiveness for previous notifications.

The static memory 220 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functionality of the PSAP device 102 as described herein are maintained, persistently, at the memory 220 and used by the controller 218, which makes appropriate utilization of volatile storage during the execution of such programming instructions.

Figure 3:
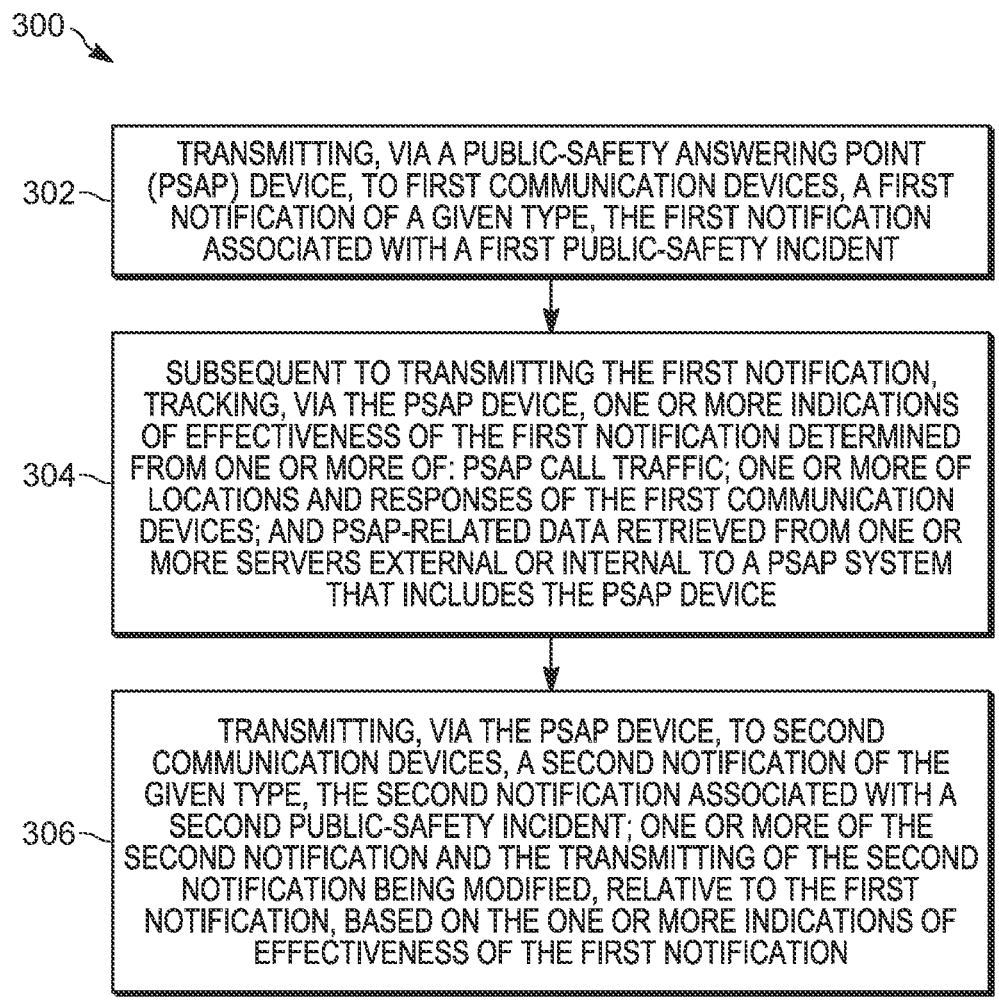
FIG. 3 is a flowchart of a method for transmitting notifications based on indications of effectiveness for previous notifications, in accordance with some examples.

In particular, the memory 220 stores instructions corresponding to the at least one application 222 that, when executed by the controller 218, enables the controller 218 to implement functionality for transmitting notifications based on indications of effectiveness for previous notifications, including but not limited to, the blocks of the method set forth in FIG. 3.

In illustrated examples, when the controller 218 executes the one or more applications 222, the controller 218 is enabled to: transmit, to first communication devices, a first notification of a given type, the first notification associated with a first public-safety incident; subsequent to transmitting the first notification, track one or more indications of effectiveness of the first notification determined from one or more of: PSAP call traffic; one or more of locations and responses of the first communication devices; and PSAP-related data retrieved from one or more servers external or internal to a PSAP system that includes the PSAP device; and transmit, to second communication devices, a second notification of the given type, the second notification associated with a second public-safety incident; one or more of the second notification and the transmitting of the second notification being modified, relative to the first notification, based on the one or more indications of effectiveness of the first notification.

The application 222 may include programmatic algorithms, and the like, to implement functionality as described herein.

Alternatively, and/or in addition to numerical algorithms, the application 222 may include machine learning models and/or algorithms, and the like, which have been trained to track indications of effectiveness of notifications, and modify subsequent notifications based on such indications of effectiveness. Furthermore, the application 222 may be operated in a training mode to train machine learning models and/or algorithms thereof to track indications of effectiveness of notifications, and modify subsequent notifications based on such indications of effectiveness.

The one or more machine learning models and/or algorithms of the application 222 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public safety environments, such as at a PSAP. Any suitable machine learning algorithm and/or deep learning algorithm and/or neural network is within the scope of present examples.

While details of the communication devices 106, 108 and the PSAP terminal 114 are not depicted, the communication devices 106, 108 and the PSAP terminal 114 may have components similar to the PSAP device 102 adapted, however, for the functionality thereof. For example, the communication devices 106, 108 may include respective notification devices (e.g., display screens, speakers, and the like) for providing notifications received from the PSAP device 102, location determining devices (e.g., GPS devices), and the like, and components for providing responses to the PSAP device 102 for the notifications, such as transceivers, speaker/microphone combinations, and the like.

Attention is now directed to FIG. 3, which depicts a flowchart representative of a method 300 for transmitting notifications based on indications of effectiveness for previous notifications. The operations of the method 300 of FIG. 3 correspond to machine readable instructions that are executed by the PSAP device 102, and specifically the controller 218 of the PSAP device 102. In the illustrated example, the instructions represented by the blocks of FIG. 3 are stored at the memory 220 for example, as the application 222. The method 300 of FIG. 3 is one way that the controller 218 and/or the PSAP device 102 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 218 and/or the PSAP device 102, transmits to the first communication devices 106, a first notification of a given type, the first notification associated with a first public-safety incident. For example, the controller 218 and/or the PSAP device 102 may transmit the first notification to the first communication devices 106 via the communication unit 202.

For example, the first public-safety incident may be any suitable public safety incident for which it may be suitable to inform the public, for example for crowd control purposes and/or for soliciting public-safety tips (e.g., from witnesses, and the like). The first public-safety incident may occur at a given location (e.g., an incident location) and/or in a given region. The first public-safety incident is understood to be reported to the PSAP device 102 by a first responder and/or an operator of a first communication device 106 and/or another communication device such that an incident record may be generated (e.g., and stored, in some examples, as the PSAP-related data 112).

The PSAP device 102, having access to network addresses, phone numbers, application registration information, and the like of the communication devices 106, 108 as well as locations thereof, may: determine a first geographic area within which to transmit a first notification; determine that the first communication devices 106 are within the first geographic area; and transmit the first notification to the first communication devices 106. It is understood that the first geographic area may include the given location and/or the incident location and/or the given region of the first public-safety incident. A size of the first geographic area, such a radius and/or shape thereof, may be predetermined and/or selected by the call-taker 116 via operation of the PSAP terminal 114, and/or determined heuristically based on previous sized of geographic areas used for previous public-safety incidents, for example of a similar type as the first public-safety incident.

At a block 304, the controller 218 and/or the PSAP device 102, subsequent to transmitting the first notification, tracks one or more indications of effectiveness of the first notification determined from one or more of: PSAP call traffic; one or more of locations and responses of the first communication devices 106; and PSAP-related data 112 retrieved from one or more servers 110 external or internal to the PSAP system 104 that includes the PSAP device 102.

As provided herein, the PSAP-related data 112 retrieved from the one or more servers 110 (e.g., external or internal to the PSAP system 104 that includes the PSAP device 102) may comprise one or more of: vehicular traffic flow data retrieved from a vehicle server; video data retrieved from PSAP-related video server; incident data retrieved from an incident server; real-time crime data retrieved from a real-time crime center server; public works data retrieved from a public works server; volume of call-related data retrieved from a call handling server; content of the call-related data retrieved from the call handling server; among other possibilities.

For example, as described herein, the controller 218 and/or the PSAP device 102 may monitor PSAP call traffic at PSAPs associated with the first geographic area (e.g., which may include, but is not limited to, the PSAP device 102). Similarly, controller 218 and/or the PSAP device 102 may monitor video data, vehicular traffic flow data, incident data, real-time crime data, public works data, volume and/or content of call-related data, and the like, as described above, to determine whether or not (and/or to what degree), the first notification was effective at assisting with handling the first public-safety incident.

The tracked indications of effectiveness may depend on the given type of the first notification.

For example, when the given type of the first notification was a public-safety tip solicitation type, the PSAP device 102 may track increases or decreases in public-safety tips and/or PSAP calls and/or volume of call-related data, and the like. Such indications of effectiveness may be determined from the PSAP call traffic (e.g., calls to the PSAP device 102 and/or other PSAPs associated with the first geographic area); responses of the first communication devices 106 to the PSAP device 102; and PSAP-related data 112 retrieved from the one or more servers 110, as described above.

In another example, when the given type of the first notification was a crowd control type, the PSAP device 102 may track, in the first geographic area and/or relative to the incident location, and the like, increases or decreases in citizens groupings and/or movement and/or increases or decreases in vehicular traffic flow and/or movement. Such indications of effectiveness may be determined from the locations of the first communication devices 106 to the PSAP device 102; and PSAP-related data 112 retrieved from the one or more servers 110, as described above. In particular, video data from cameras in the first geographic area may be used to determine citizens groupings, vehicular traffic flow, and the like, and/or vehicular traffic flow data may be used to determine vehicular traffic flow.

However, the given type of the first notification may also be associated with an incident type. For example, the first public-safety incident may be of a particular incident type (e.g., a car accident or a train accident), and hence given type of the first notification may be for such a particular incident type.

Other examples of indications of effectiveness that may be tracked may include, but are not limited to, increases or decreases of public-safety incidents and/or crime in the first geographic region, and/or the given region of the incident, and the like. For example, increases in public-safety incidents and/or crime in the first geographic region and/or the given region of the incident may indicate that the first notification was ineffective, and decreases in public-safety incidents and/or crime in the first geographic region and/or the given region of the incident may indicate that the first notification was effective.

Yet further examples of indications of effectiveness may include, but are not limited to, tracking content of responses and/or call-related data associated with first communication devices 106, for example to determine whether responses and/or call-related data associated with the first communication devices 106 indicate that the first notification was effective. In a particular example, a response, from a first communication device 106, to the first notification, which may pertain to warning of a parade occurring, may be questioning why a public-safety notification of a parade that all the locals know about is being transmitted (e.g., with such content stored at a server 110 as the PSAP-related data 112 in the form of text, which may be generated from a speech-to-text engine at the PSAP device 102 and/or another PSAP).

Yet further examples of indications of effectiveness may include, but are not limited to, tracking responses of the first communication devices 106 based on an associated registered location, for example to determine whether first communication devices 106 associated with operators local to the first public-safety incident are responding to the first notification, as compared to whether operators not local to the first public-safety incident (e.g., such as tourists) are responding to the first notification. For example, returning to the example of the parade, when responses of the first communication devices 106 are predominantly from non-locals, and not locals, the first notification may be determined to be effective, and, conversely, when responses of the first communication devices 106 are predominantly from locals, and not non-locals, the first notification may be determined to be ineffective (e.g., as locals may already know about the parade).

Yet another indication of effectiveness may include, but is not limited to, a number of times that the first notification is opened and/or read at the first communication devices 106. For example, the first communication devices 106 may be enabled to determine when the first notification is opened and/or read and provide a response to the PSAP device 102 accordingly. The more times the first notification is opened and/or read at the first communication devices 106, the more effective the first notification may be determined to be.

Hence, as provided herein, the one or more indications of effectiveness of the first notification may comprise, subsequent to transmitting the first notification one or more of: an increase or decrease to the PSAP call traffic at PSAPs associated with the first geographic area, the first notification transmitted to the first communication devices 106 in the first geographic area, the PSAP call traffic associated with one or more of the first public-safety incident and the responses of the first communication devices 106; a number of the responses of the first communication devices 106; one or more of a decrease and change in vehicle routing in vehicular traffic flow within the first geographic area; a decrease in citizen groupings within the first geographic area; an increase in volume of public-safety tips associated with one or more of the first public-safety incident and the PSAP calls of the first communication devices 106; and changes of the locations of the first communication devices 106 relative to an incident location of the first public-safety incident.

At a block 306, the controller 218 and/or the PSAP device 102, to the second communication devices 108, a second notification of the given type, the second notification associated with a second public-safety incident; one or more of the second notification and the transmitting of the second notification being modified, relative to the first notification, based on the one or more indications of effectiveness of the first notification. For example, the controller 218 and/or the PSAP device 102 may transmit the second notification to the second communication devices 108 via the communication unit 202. The second public-safety incident may occur in same and/or similar region as the first public-safety incident, or the second public-safety incident may occur in a different region from the first public-safety incident.

The second notification is generally modified to increase effectiveness thereof, for example relative to the first notification.

For example, content of the second notification may be modified. In one example, when the first notification of the first public-safety incident included text of "A public-safety incident is occurring at 123 Main St.; please exit the area" (e.g., assuming that 123 Main St. is the incident location) and the public safety devices determined that citizens and/or vehicles moved towards the incident location, the second notification of the second public-safety incident may omit a specific address of the second public-safety incident and/or add urgency words to the second notification, relative to the first notification. For example, the second notification of the second public-safety incident included text of "A public-safety incident is occurring near $1^{st}$ and Main and may be a public danger; please move away from $1^{st}$ and Main" (e.g., assuming that $1^{st}$ and Main is an intersection near the incident location, but not the exact incident location).

Similarly, the second geographic area within which the second communication devices 108 are located may be increased or decreased in size, relative to the first geographic area, for example to attempt to increase or decrease the number "M" of the second communication devices 108 relative to the number "N" of the first communication devices 106. For example, when the first notification resulted in too few public-safety tips from the first communication devices 106 for the first public-safety incident, a radius of the second geographic area may be increased relative to the radius of the first geographic area to attempt to increase the number "M" of the second communication devices 108 to attempt to increase public-safety tips therefrom. In some examples, increasing or decreasing a relative size of the second geographic area may be threshold based; in particular, when a number public-safety tips from the first communication devices 106 for the first public-safety incident is below a threshold number, the relative size of the second geographic area may be increased, among other possibilities.

Similarly, a timing of the transmitting of the second notification may be modified relative to the transmitting of the first notification. For example, when the first public-safety incident occurred at night, and the first notification also occurred at night, for example at 3 am, and too few public-safety tips from the first communication devices 106 resulted (e.g., which may be a threshold based determination), the second notification for the second public-safety incident, which may also occur at night, may be transmitted a time during daytime hours. Similarly, when the first public-safety incident occurred at night, and the first notification also occurred at night, for example at 3 am, and there was a decrease in public-safety tips relative to similar public incidents when notifications therefor were transmitted in daytime hours (e.g., as indicated by the PSAP-related data 112), the second notification for the second public-safety incident, which may also occur at night, may be transmitted a time during daytime hours.

Similarly, a type the second communication devices 108 to which the second notification is transmitted may be modified, relative to types of the first communication devices 106. For example, when the first and second public-safety incidents are both parades, the first notification, transmitted to both "local" and "non-local" communication devices 106, may have resulted in complaints from first communication devices 106 associated with operators who live local to the region of the parade. As such, the type of the second communication devices 108 may be changed to "non-local" communication devices (e.g., and/or "local" communication devices may be excluded from receiving the second notification) such that second communication devices 108 operated by tourists, and the like, in the second geographic region, receive the second communication.

However, types and/or subsets of the second communication devices 108 may be modified relative the first communication devices 106, based on any suitable factors, such as ages of operators of the communication devices 106, 108, whether or not the first notification is opened and/or read at the first communication devices 106, among other possibilities.

Hence, as described above, the one or more of the second notification, and the transmitting of the second notification, are modified, relative to the first notification by one or more of: modifying content of the second notification relative to the first notification; modifying a second geographic area within which the second communication devices are located, relative to a first geographic area to which the first communication devices are located; modifying to a timing of the transmitting of the second notification relative to the transmitting of the first notification; modifying a type of the second communication devices to which the second notification is transmitted, relative to types of the first communication devices; among other possibilities.

Similarly, the tracking the one or more indications of effectiveness at the block 304 may comprise the controller 218 and/or the PSAP device 102 determining one or more trends that increase the effectiveness of notifications of the given type (e.g., of the first notification and the second notification). For example, the PSAP-related data 112 may store previous indications of effectiveness for notifications of given types, and indications of effectiveness of the first notification may be compared to such trends. In these examples, one or more of the second notification, and the transmitting of the second notification, may be modified based on such trends. Hence, for example, when such trends show that nighttime notifications result in fewer public-safety tips as compared to daytime notifications, and the first notification was night, the second notification may be in the daytime, as previously described.

Other features are within the scope of the present specification and/or the method 300. For example, the interface 122, and/or the display screen 118 and the input device 120, may be used to generate notifications, and/or modify notifications and the like.

In particular, the first notification of the block 302 of the method 300 may be generated by the controller 218 and/or the PSAP device 102 based on a first request to generate notifications for the given type, the first request identifying one or more of: the given type of the first notification; the first geographic area within which the first communication devices 106 that are to receive the first notification are located; and an indication of a requested response from users of the first communication devices 106, which may be incorporated into the first notification. For example, when the first public-safety incident occurs (e.g., is reported to the PSAP device 102), the PSAP device 102 may provide an indication of the first public-safety incident at the display screen 118 via the interface 122, which may include electronic selectable options and/or drop down menus and/or fields and/or electronic buttons for selecting and/or entering the given type of the first notification, a size and/or shape of the first geographic area, and/or text, and the like, which indicates a requested response from users of the first communication devices 106 (e.g., text such as "Please call in tips"). For example, the call-taker 116 may operate the input device 120 to generate the first request to generate notifications for the given type, which may be provided (e.g., via actuation of an electronic button, and the like), to the PSAP device 102. The PSAP device 102, in response to receiving the first request, may generate the first notification, determine the first communication devices 106 within the first geographic area, and transmit the first notification of the block 302 of the method 300 accordingly.

Similarly, the second notification of the block 306 of the method 300 may be generated by the controller 218 and/or the PSAP device 102 based on a second request to generate notifications of the given type, the second request generated via the input device 120 and the interface 122 provided at the display screen 118, similar to as described above with respect to generating the first notification of the block 302 of the method 300 using the interface 122. However, with regards to generating the second notification, the interface 122 may provide one or more indications for modifying one or more of the second notification, and the transmitting, relative to the first notification, based on the one or more indications of effectiveness of the first notification. For example, when the indications of effectiveness show that transmitting the second notification at a given time may increase the effectiveness of the second notification (e.g., relative to the first notification), the interface 122 may provide an indication suggesting that transmitting the second notification occur at such a time, which may be accepted (or not accepted) by the call-taker 116 via an electronic button at the interface 122; when the given time is accepted, the second request to generate notifications of the given type may be provided to the PSAP device 102 with the given time, such that the PSAP device 102, in response to receiving the second request, may generate the second notification, determine the second communication devices 108 within the second geographic area, and transmit the second notification of the block 306 of the method 300 at the given time accordingly. However, the interface 122 may provide any suitable indication for modifying the second notification according to any suitable indication of effectiveness.

Hence, the method 300 may further comprise the controller 218 and/or the PSAP device 102: providing, at the display screen 118 associated with the PSAP device 102 (e.g., and/or any suitable display screen associated with the PSAP device 102), one or more indications for modifying one or more of the second notification, and the transmitting, relative to the first notification, based on the one or more indications of effectiveness of the first notification; receiving, via the input device 120 associated with the PSAP device 102 (e.g., and/or any suitable input device associated with the PSAP device 102), an acceptance of the one or more indications; and in response to receiving, the acceptance, transmitting the second notification.

Figure 4:
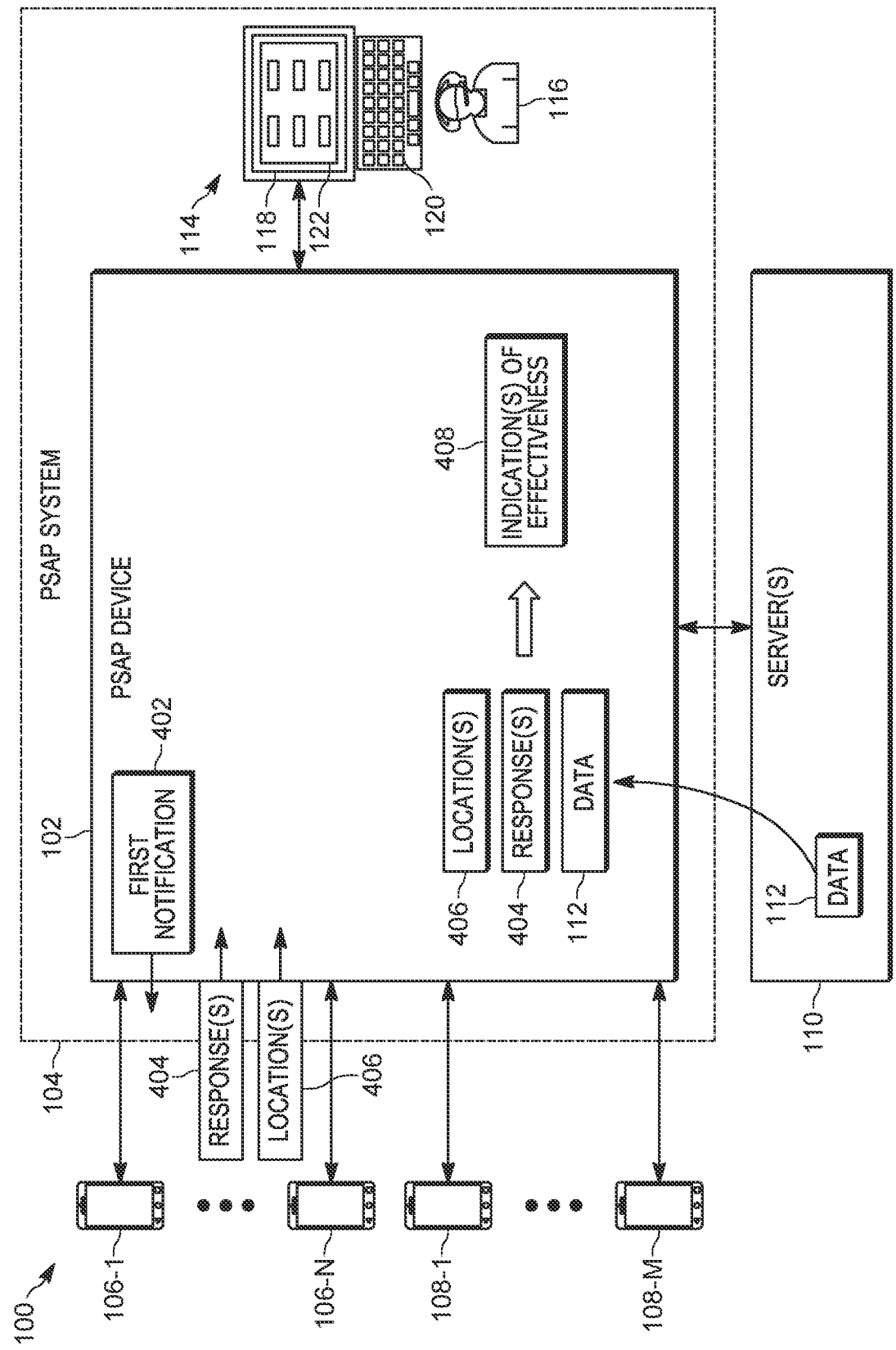
FIG. 4 depicts the system of FIG. 1 implementing a method for transmitting notifications based on indications of effectiveness for previous notifications, in accordance with some examples.
Figure 5:
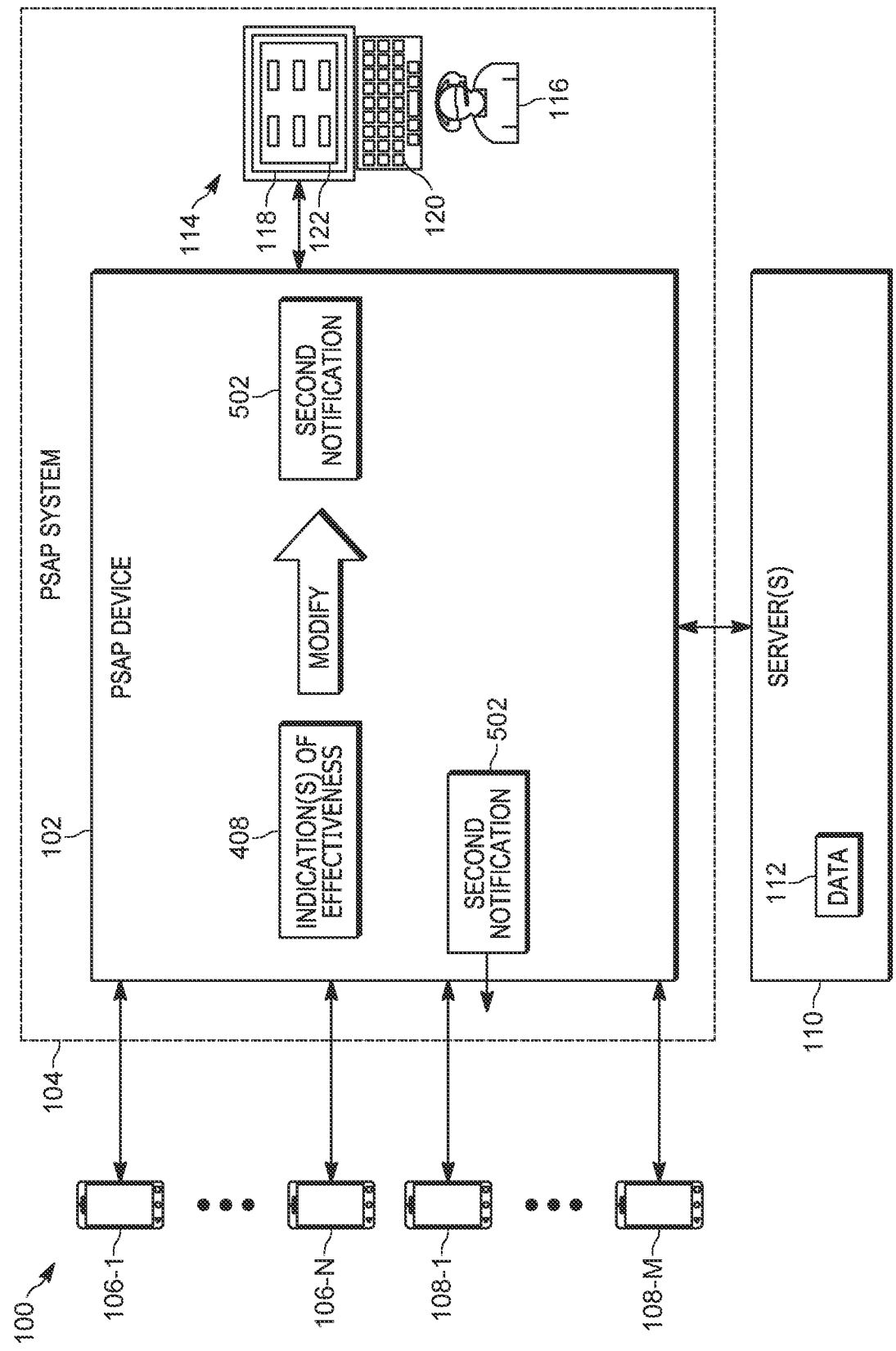
FIG. 5 depicts the system of FIG. 1 continuing to implement a method for transmitting notifications based on indications of effectiveness for previous notifications, in accordance with some examples.

Attention is next directed to FIG. 4 and FIG. 5, which depict the system 100 implementing an example of the method 300. FIG. 4 and FIG. 5 are similar to FIG. 1 with like components having like numbers.

Attention is first directed to FIG. 4, which depicts the PSAP device 102 transmitting (e.g., at the block 302 of the method 300) a first notification 402 to the first communication devices 106. It is understood that the first notification 402 of a given type (e.g., as described herein) and that first notification 402 is associated with a first public-safety incident. It is further understood that the first communication devices 106 may be in a first geographic area within which the first public-safety incident occurred.

As further depicted in FIG. 4, the PSAP device 102 may receive responses 404 to the first notification 402 from one or more of the first communication devices 106 though, in some examples, no responses may be received. As depicted, the PSAP device 102 may receive locations 406 of the first communication devices 106 though, in some examples, no locations may be received; the locations 406 may be received periodically and/or the locations 406 may be received in response to the first notification 402 and/or the locations 406 may be received periodically in response to the first notification 402 so that the PSAP device 102 may track locations of the first communication devices 106.

As further depicted in FIG. 4, the PSAP device 102, subsequent to transmitting the first notification 402, may track (e.g., at the block 304 of the method 300) one or more indications 408 of effectiveness of the first notification 402 determined from one or more of: PSAP call traffic (e.g., a volume of the responses 404 from the first communication devices 106 and/or other communication devices to the PSAP device 102 and/or other PSAPs, which may be retrieved from the other PSAPs by the PSAP device 102); one or more of the locations 406 and the responses 404 of the first communication devices 106; and the PSAP-related data 112, which, as depicted, may be retrieved from the one or more servers 110. The indications 408 of effectiveness may increase (e.g., and/or indicate that the first notification 402 was effective) or decrease (e.g., and/or indicate that that the first notification 402 was ineffective) over time, for example as the responses 404 and/or locations 406 are received, and/or as the PSAP-related data 112 changes over time (e.g., to show changes in citizen groupings and/or vehicular traffic flow, among other possibilities).

Regardless, the indications 408 of effectiveness may be used to modify a second notification associated with a second public-safety incident, relative to the first notification 402.

Attention is next directed to FIG. 5 where a second notification 502 is generated. It is understood that the second notification 502 may, at least initially, be of the same given type as the first notification 402, and that the second notification 502 is associated with a second public-safety incident. It is further understood that the second communication devices 108 may be in a second geographic area within which the second public-safety incident occurred and that the second geographic area may, at least initially, be of a same, and/or similar size as the first geographic area.

However, as also depicted in FIG. 5, the second notification 502 may be modified relative to the first notification 402, based on the indications 408 of effectiveness and transmitted (e.g., at the block 306 of the method 300) to the second notification devices 108. Content of the second notification 502 may be same or different as the first notification 402 and/or a time of transmission and/or a size of the second geographic area used to select the second notification devices 108 may be modified as described herein, relative to a time of transmission and/or a size of the first geographic area used to select the first communication devices 106 among other possibilities. Regardless, the PSAP device 102 generates the second notification 502 to be more effective at assisting the PSAP device 102 and/or first responders with the second public-safety incident, as compared to effectiveness of the first notification 402.

Figure 6:
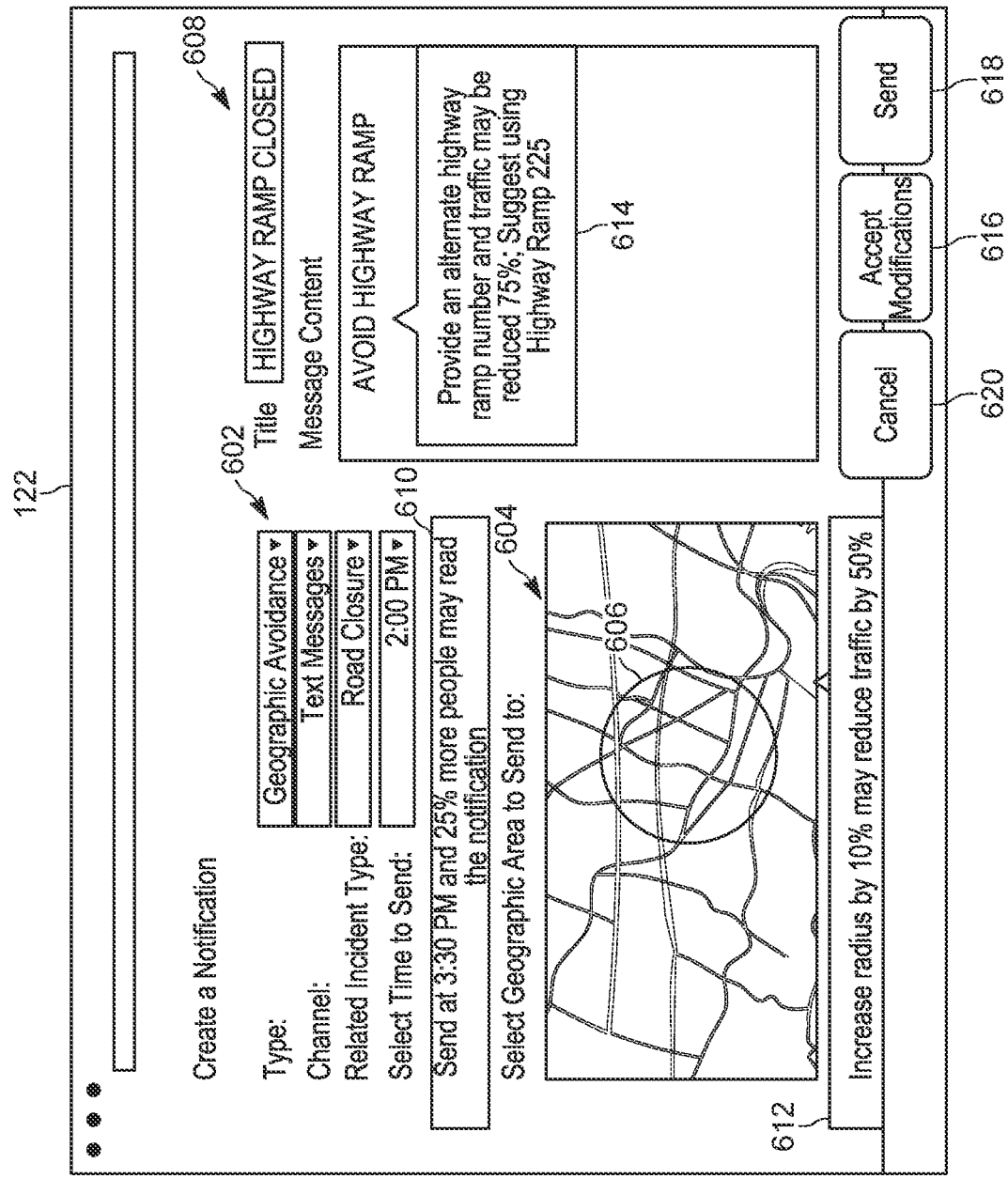
FIG. 6 depicts an example of an interface used to generate a request to generate a notification for a public-safety incident, in accordance with some examples.

Attention is next directed to FIG. 6, which depicts an example of the interface 122 being used to generate a request to generate a notification for a public-safety incident. While the interface 122 is depicted without the display screen 118, it is understood that the interface 122 is provided at the display screen 118 (e.g., and/or another display screen) and that the interface 122 may be generated by the PSAP device 102 and/or the PSAP terminal 114. It is assumed in the depicted interface 122 that at least one first notification for at least one first public-safety incident has already been transmitted in the past and that indications of effectiveness have been tracked, as described herein. Hence, the interface 122 is described with reference to transmitting a second notification for a second public-safety incident (e.g., of the same type as the at least one first public-safety incident, which has depicted is road closure and, in particular is a highway ramp closure), and a second geographic area used to select the second communication devices 108.

As depicted, the interface 122 includes electronic drop-down menus 602, which may be used (e.g., via operation of the input device 120) to select a type of a second notification (e.g., as depicted a "Geographic Avoidance" alert), a "channel" for transmitting the second notification to the second communication devices 108 (e.g., as depicted, the second notification has been selected to be transmitted via text messages), a type of an associated public-safety incident (e.g., a "Road Closure") and a time to transmit the second notification (e.g., as depicted "2:00 PM" has been selected).

As also depicted, the interface 122 includes an electronic geographic map 604 of the region of the associated public-safety incident, which includes an electronic selectable option 606 to change a size of the second geographic area used to select the second communication devices 108. For example, the selectable option 606 comprises a circle overlaid on the electronic geographic map 604, and whose size may be changed (e.g., a radius thereof may be increased or decreased) to change the size of the second geographic area.

As further depicted, the interface 122 further includes fields 608 where content of the second notification may be populated, automatically (e.g., as depicted), and/or manually, and/or changed manually. For example, as depicted, a Title field has been populated with "HIGHWAY RAMP CLOSED" and a Message Content field has been populated with "AVOID HIGHWAY RAMP 227"; the number of the highway ramp may be determined from incident information of the PSAP-related data 112, among other possibilities.

As depicted, the interface 122 includes various indications 610, 612, 614 for modifying one or more of the second notification, and the transmitting of the second notification based on the one or more indications of effectiveness determined, for example, from previous first notification of highway ramp closures.

For example, the indication 610 indicates that modifying a transmission time from the selected 2:00 PM to 3:30 PM may cause 25% more people to read the second notification. Hence, the call-taker 116, and the like, may operate the input device 120 to modify the transmission time using the appropriate drop-down menu 602 from 2:30 PM to 3:30 PM.

Similarly, the indication 612 indicates that increasing the radius of the of the circle of the selectable option 606 (e.g., the second geographic area) may reduce traffic by 50%, for example in the region of the closed highway ramp. Hence, the call-taker 116, and the like, may operate the input device 120 to increase the radius of the circle of the selectable option 606 by 10% (and/or some other value).

Similarly, the indication 614 indicates that providing an alternate highway ramp number may reduce traffic by 75%, for example in the region of the closed highway ramp. As depicted, the indication 614 may further suggest such an alternate highway ramp number (e.g., as depicted, "Highway Ramp 25"). Hence, the call-taker 116, and the like, may operate the input device 120 to modify the message in the appropriate field 608.

While modifications to the second notification may occur via operation of the input device 120, in other examples, modifications to the second notification may occur automatically and/or upon selection of an appropriate electronic button such as an electronic button 616, which, when actuated (e.g., via the input device 120), may cause the modifications suggested at the indications 612, 612, 614 to be accepted such that the second notification is modified. As depicted, the interface 122 further includes an electronic button 618, which, when actuated, causes a request for the second notification to be generated to be provided to the PSAP device 102 (e.g., before or after the modifications occur). For completeness, the interface 122 further includes an electronic button 620, which, when actuated, causes the second notification to be cancelled.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot modify notifications based on indications of effectiveness of previous notifications).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
transmitting, via a public-safety answering point (PSAP) device, to first communication devices, a first notification of a given type, the first notification associated with a first public-safety incident;
subsequent to transmitting the first notification, tracking, via the PSAP device, one or more indications of effectiveness of the first notification determined from one or more of: PSAP call traffic; one or more of locations and responses of the first communication devices; and PSAP-related data retrieved from one or more servers external or internal to a PSAP system that includes the PSAP device; and
transmitting, via the PSAP device, to second communication devices, a second notification of the given type, the second notification associated with a second public-safety incident; one or more of the second notification and the transmitting of the second notification being modified, relative to the first notification, based on the one or more indications of effectiveness of the first notification,
wherein the second notification is generated based on a second request to generate notifications of the given type, the second request generated via an input device and an interface provided at a display screen,
the interface providing one or more indications for modifying one or more of: the second notification relative to the first notification; and the transmitting the second notification.

2. The method of claim 1, wherein the one or more indications of effectiveness of the first notification comprises one or more of:
an increase or decrease to the PSAP call traffic at PSAPs associated with a first geographic area, the PSAP call traffic associated with one or more of the first public-safety incident and the responses of the first communication devices;
a number of the responses of the first communication devices;
one or more of a decrease and change in vehicle routing in vehicular traffic flow within the first geographic area;
a decrease in citizen groupings within the first geographic area;
an increase in volume of public-safety tips associated with one or more of the first public-safety incident and the PSAP calls of the first communication devices; and
changes of the locations of the first communication devices relative to an incident location of the first public-safety incident.

3. The method of claim 1, wherein the one or more of the second notification, and the transmitting of the second notification, are modified, relative to the first notification by one or more of:
modifying content of the second notification relative to the first notification;
modifying a second geographic area within which the second communication devices are located, relative to a first geographic area to which the first communication devices are located;
modifying to a timing of the transmitting of the second notification relative to the transmitting of the first notification; and
modifying a type of the second communication devices to which the second notification is transmitted, relative to types of the first communication devices.

4. The method of claim 1, wherein the tracking the one or more indications of effectiveness comprises determining one or more trends that increase the effectiveness of notifications of the given type, and wherein the one or more of the second notification, and the transmitting of the second notification, are modified based on the trend.

5. The method of claim 1, wherein the first notification is generated based on a first request to generate notifications for the given type, the first request identifying one or more of:
the given type;
a first geographic area within which the first communication devices that are to receive the first notification are located; and
an indication of a requested response from users of the first communication devices, which is incorporated into the first notification.

6. The method of claim 1, further comprising:
providing, at a display screen associated with the PSAP device, one or more indications for modifying one or more of: the second notification relative to the first notification; and the transmitting the second notification;
receiving, via an input device associated with the PSAP device, an acceptance of the one or more indications; and
in response to receiving, the acceptance, transmitting the second notification.

7. The method of claim 1, wherein the PSAP-related data retrieved from the one or more servers external or internal to the PSAP system that includes the PSAP device comprises one or more of:
vehicular traffic flow data retrieved from a vehicle server;
video data retrieved from PSAP-related video server;
incident data retrieved from an incident server;
real-time crime data retrieved from a real-time crime center server;
public works data retrieved from a public works server;
volume of call-related data retrieved from a call handling server; and
content of the call-related data retrieved from the call handling server.

8. The method of claim 1, wherein the first communication devices and the second communication devices are selected from communication devices registered to receive notifications.

9. The method of claim 1, wherein the given type of the first notification and the second notification comprises one or more of:
an AMBER alert;
a SILVER alert;
an evacuation alert;
an incident information request;
a suspect information request;
a hazardous materials alert;
a geographic area avoidance alert; and
a be-on-the-lookout (BOLO) alert.

10. A public-safety answering point (PSAP) device comprising:
a communication unit; and
a controller communicatively coupled to the communication unit, the controller configured to:

transmit, via the communication unit, to first communication devices, a first notification of a given type, the first notification associated with a first public-safety incident;

subsequent to transmitting the first notification, tracking one or more indications of effectiveness of the first notification determined from one or more of: PSAP call traffic; one or more of locations and responses of the first communication devices; and PSAP-related data retrieved from one or more servers external or internal to a PSAP system that includes the PSAP device; and transmit, via the communication unit, to second communication devices, a second notification of the given type, the second notification associated with a second public-safety incident; one or more of the second notification and transmitting of the second notification being modified, relative to the first notification, based on the one or more indications of effectiveness of the first notification, wherein the second notification is generated based on a second request to generate notifications of the given type, the second request generated via an input device and an interface provided at a display screen, the interface providing one or more indications for modifying one or more of: the second notification relative to the first notification; and the transmitting the second notification.

11. The PSAP device of claim 10, wherein the one or more indications of effectiveness of the first notification comprises one or more of:

an increase or decrease to the PSAP call traffic at PSAPs associated with a first geographic area, the PSAP call traffic associated with one or more of the first public-safety incident and the responses of the first communication devices;

a number of the responses of the first communication devices;

one or more of a decrease and change in vehicle routing in vehicular traffic flow within the first geographic area;

a decrease in citizen groupings within the first geographic area;

an increase in volume of public-safety tips associated with one or more of the first public-safety incident and the PSAP calls of the first communication devices; and changes of the locations of the first communication devices relative to an incident location of the first public-safety incident.

12. The PSAP device of claim 10, wherein controller is further configured to modify the one or more of the second notification, and the transmitting of the second notification, relative to the first notification, by one or more of:

modifying content of the second notification relative to the first notification;

modifying a second geographic area within which the second communication devices are located, relative to a first geographic area to which the first communication devices are located;

modifying to a timing of the transmitting of the second notification relative to the transmitting of the first notification; and modifying a type of the second communication devices to which the second notification is transmitted, relative to types of the first communication devices.

13. The PSAP device of claim 10, wherein the controller is further configured to:

track the one or more indications of effectiveness by determining one or more trends that increase the effectiveness of notifications of the given type; and modify one or more of the second notification, and the transmitting of the second notification, based on the trend.

14. The PSAP device of claim 10, wherein the controller is further configured to generate the first notification based on a first request to generate notifications for the given type, the first request identifying one or more of:

the given type;

a first geographic area within which the first communication devices that are to receive the first notification are located; and an indication of a requested response from users of the first communication devices, which is incorporated into the first notification.

15. The PSAP device of claim 10, wherein the controller is further configured to:

provide, at a display screen, one or more indications for modifying one or more of: the second notification relative to the first notification; and the transmitting the second notification;

receiving, via an input device associated with the PSAP device, an acceptance of the one or more indications; and in response to receiving, the acceptance, transmitting the second notification.

16. The PSAP device of claim 10, wherein the PSAP-related data retrieved from the one or more servers external or internal to the PSAP system that includes the PSAP device comprises one or more of:

vehicular traffic flow data retrieved from a vehicle server;

video data retrieved from PSAP-related video server;

incident data retrieved from an incident server;

real-time crime data retrieved from a real-time crime center server;

public works data retrieved from a public works server;

volume of call-related data retrieved from a call handling server; and content of the call-related data retrieved from the call handling server.

17. The PSAP device of claim 10, wherein the controller is further configured to select the first communication devices and the second communication devices from communication devices registered to receive notifications.

18. The PSAP device of claim 10, wherein the given type of the first notification and the second notification comprises one or more of:

an AMBER alert;

a SILVER alert;

an evacuation alert;

an incident information request;

a suspect information request;

a hazardous materials alert;

a geographic area avoidance alert; and a be-on-the-lookout (BOLO) alert.

19. A method comprising:

transmitting, via a public-safety answering point (PSAP) device, to first communication devices, a first notification of a given type, the first notification associated with a first public-safety incident;

subsequent to transmitting the first notification, tracking, via the PSAP device, one or more indications of effectiveness of the first notification determined from one or more of: PSAP call traffic; one or more of locations and responses of the first communication devices; and PSAP-related data retrieved from one or more servers external or internal to a PSAP system that includes the PSAP device;

transmitting, via the PSAP device, to second communication devices, a second notification of the given type, the second notification associated with a second public-safety incident; one or more of the second notification and the transmitting of the second notification being modified, relative to the first notification, based on the one or more indications of effectiveness of the first notification;

providing, at a display screen associated with the PSAP device, one or more indications for modifying one or more of: the second notification relative to the first notification; and the transmitting the second notification;

receiving, via an input device associated with the PSAP device, an acceptance of the one or more indications; and in response to receiving, the acceptance, transmitting the second notification.

\* \* \* \* \*